United States Patent
Mizukawa et al.

(10) Patent No.: US 11,975,412 B2
(45) Date of Patent: May 7, 2024

(54) DEVICE AND METHOD FOR FEEDING AND FASTENING A PART

(71) Applicant: NEWFREY LLC, New Britain, CT (US)

(72) Inventors: Noriko Mizukawa, Toyohashi (JP); Daisuke Miura, Toyohashi (JP); Hiroyo Makino, Toyohashi (JP)

(73) Assignee: NEWFREY LLC, New Britain, CT (US)

( * ) Notice: Subject to any disclaimer, the term of this patent is extended or adjusted under 35 U.S.C. 154(b) by 173 days.

(21) Appl. No.: 17/865,750

(22) Filed: Jul. 15, 2022

(65) Prior Publication Data

US 2023/0001523 A1 Jan. 5, 2023

Related U.S. Application Data

(63) Continuation of application No. PCT/JP2020/047822, filed on Dec. 22, 2020.

(30) Foreign Application Priority Data

Jan. 16, 2020 (JP) .................................. 2020-005098

(51) Int. Cl.
*B23P 19/02* (2006.01)
*B23P 19/00* (2006.01)

(52) U.S. Cl.
CPC ............. *B23P 19/02* (2013.01); *B23P 19/006* (2013.01)

(58) Field of Classification Search
CPC ....... B23P 19/02; B23P 19/006; B21J 15/025; B21J 15/32
See application file for complete search history.

(56) References Cited

U.S. PATENT DOCUMENTS

| 5,291,645 A | 3/1994 | Aoyama |
| 5,813,114 A | 9/1998 | Blacket et al. |

(Continued)

FOREIGN PATENT DOCUMENTS

| CN | 10082969 A | 3/1994 |
| CN | 101200245 A | 6/2008 |

(Continued)

OTHER PUBLICATIONS

EP Search Report Dated Dec. 19, 2023 cited in corresponding EP Patent Application No. 20914029.2.

(Continued)

*Primary Examiner* — Bayan Salone
(74) *Attorney, Agent, or Firm* — Michael P. Leary

(57) ABSTRACT

A feeding and fastening device for a coin-shaped fastener and comprising: a punch tool; a feeding device configured to feed the fastener one at a time; a hollow pillar-shaped portion below the punch tool; a holding portion to temporarily hold the fastener fed though a side surface thereof and to release the fastener when the punch tool pushes down on that fastener; a part passage route portion below the holding portion for guiding the fastener downward in a vertical orientation by means of a cross section with a width that prevents inversion; a guide portion below the passage route portion guides the fastener from the vertical orientation to a horizontal orientation; and a fastening portion below the guide portion receives the fastener in the vertical orientation and locates the fastener above the workpiece until struck by the punch tool.

18 Claims, 8 Drawing Sheets

(56) References Cited

U.S. PATENT DOCUMENTS

| | | | |
|---|---|---|---|
| 5,964,393 A | 10/1999 | Feldpausch et al. | |
| 6,968,939 B1 | 11/2005 | Mauer et al. | |
| 10,455,749 B2 | 10/2019 | Motowaki | |
| 2020/0384525 A1* | 12/2020 | Gostylla | B21J 15/025 |

FOREIGN PATENT DOCUMENTS

| | | | | |
|---|---|---|---|---|
| CN | 108382822 A | | 8/2018 | |
| DE | 19704480 A | | 8/1998 | |
| DE | 19704480 A1 | * | 8/1998 | B21J 15/32 |
| GB | 1466015 A | | 3/1977 | |
| GB | 2569122 A | * | 6/2019 | B21J 15/025 |
| JP | S50137844 A | | 11/1975 | |
| JP | S5870879 A | | 4/1983 | |
| JP | 8107294 A | | 4/1996 | |
| JP | H08505089 A | | 6/1996 | |
| JP | H11216622 A | | 8/1999 | |
| JP | 2000516538 A | | 12/2000 | |
| JP | 2000516538 A | * | 12/2000 | B21J 15/32 |
| JP | 2017048056 A | | 3/2017 | |
| JP | 2017048056 A | * | 3/2017 | |
| JP | 2018144953 A | | 9/2018 | |

OTHER PUBLICATIONS

Chinese Office Action Dated Nov. 13, 2023 cited in corresponding Chinese Application No. 202080092673.8.

* cited by examiner

A

B

C

D

E

F

A B C

D E

DEVICE AND METHOD FOR FEEDING AND FASTENING A PART

CROSS-REFERENCE TO RELATED APPLICATIONS

This application is a continuation of PCT Application No. PCT/JP2020/047822, filed on Dec. 22, 2020 which claims priority from Japanese Patent Application No. 2020-005098, filed on Jan. 16, 2020, the entire disclosure of which is incorporated herein by reference.

BACKGROUND OF THE PRESENT INVENTION

The present invention relates to a device and a method for accepting coin-shaped parts such as metal for piercing and attaching them to a member to be attached.

When feeding coin-shaped parts such as 10 mm and 14 mm diameter metals for piercing from a feeder device to a receiver of a fastening device and fastening them, since the metal for piercing has a circular flat surface and a T-shaped cross section and the fastening directions of the upper and lower surfaces are determined, it is necessary for the parts discharged from the feeder device to be loaded to the tip of the receiver without being inverted.

In this regard, for example, in Japanese Unexamined Patent Application Publication No. 11-216622 there is a tool for preventing inversion by having a cross section of the feeder device having a shape matching the shape of a part such as a rivet.

However, in the conventional construction method, since the units of metal for piercing are manually placed one by one at the fastening position and positioned, the fastening position varies, and it takes some time to perform the setting.

SUMMARY OF THE PRESENT INVENTION

Therefore, an object of the present invention is to provide a device and a method for loading a coin-shaped part such as a metal for piercing into the tip of a fastening device appropriately and in a short period of time.

To achieve this object, one aspect of the present invention is a device that receives a fed coin-shaped part and fastens the part to an attached member; the device is provided with the following: a hollow pillar-shaped portion configured so that a punch tool for fastening the part to the attached member can be inserted from above; a holding portion configured to release the part from temporary holding, by temporarily holding the part fed from the side surface of the hollow pillar-shaped portion and pushing down the part by the punch tool; a part passage route portion having a cross section of a width that does not cause inversion of the front and back of the part, extending downward from the holding portion so that the part can pass through while maintaining a state in which the front surface and the back surface of the part are parallel to each other in the vertical direction; a guide portion that guides the part that has passed through the part passage route portion from a state in which the front surface and the back surface of the part are parallel to each other in the vertical direction to a state in which the front surface and the back surface of the part are oriented in the horizontal direction; and a fastening portion that fastens the part to the attached member with the front and back surfaces of the part facing horizontally due to the guide portion.

In the device, the holding portion is configured preferably to hold the part between two steel balls with the front and back surfaces of the part parallel to each other in the vertical direction.

In the above device, the guide portion preferably has an inclined surface inclined below the part passage route portion to guide the part from a state in which the front surface and the back surface of the part are parallel to each other in the vertical direction to a state in which the front surface and the back surface of the part are oriented in the horizontal direction, and the inclined surface has a guide groove that guides the surface of the part to gradually face upward.

In the above device, the hollow pillar-shaped portion and the part passage route portion are preferably configured such that they overlap at least partially as viewed in a plan view.

In the above device, in a state in which the punch tool pushes down the part held by the holding portion, the part to which the punch tool is to be fed next is preferably configured so as to be prevented from being fed from the side surface of the hollow pillar-shaped portion by the side surface of the punch tool.

In the device, the part is preferably metal for piercing.

Another aspect of the present invention is a method for feeding a coin-shaped part in a device and fastening the part to a member to be attached, wherein the method has the following: a holding step for temporarily holding the part fed from the side surface of the hollow pillar-shaped portion of the device in a holding portion; a release step for releasing the part from temporary holding by the holding portion, by pushing down the part by a punch tool inserted from above the hollow pillar-shaped portion; a drop step that allows the part to fall naturally in the part passage route that extends downward from the holding portion, while maintaining the vertical parallel state of the front and back surfaces of the part released from temporary holding; a guidance step for guiding the part that has fallen through the part passage route from a state in which the front surface and the back surface of the part are parallel to each other in the vertical direction to a state in which the front surface and the back surface of the part are oriented in the horizontal direction; and a fastening step for fastening the part to the mounted member with the front and back of the part facing horizontally.

In the above method, the guiding step preferably further comprises guiding the surface of the part to gradually face upward by a guide groove formed on an inclined surface below the part passage route.

In the above method, the part to be fed next to the part is preferably prevented from being fed from the side surface of the hollow pillar-shaped portion by the side surface of the punch tool, in the state in which the part held by the holding portion is pushed down.

In the conventional construction method, parts are manually placed one by one at the fastening point and positioned so that the fastening position varies and it takes some time to set. According to the present invention, it is possible to shorten the time and to automatically supply parts for feeding and fastening.

DETAILED DESCRIPTION OF THE PREFERRED EMBODIMENTS

Hereinafter, embodiments of the feeding and fastening device according to the present invention will be described with reference to the drawings.

Figure 1:
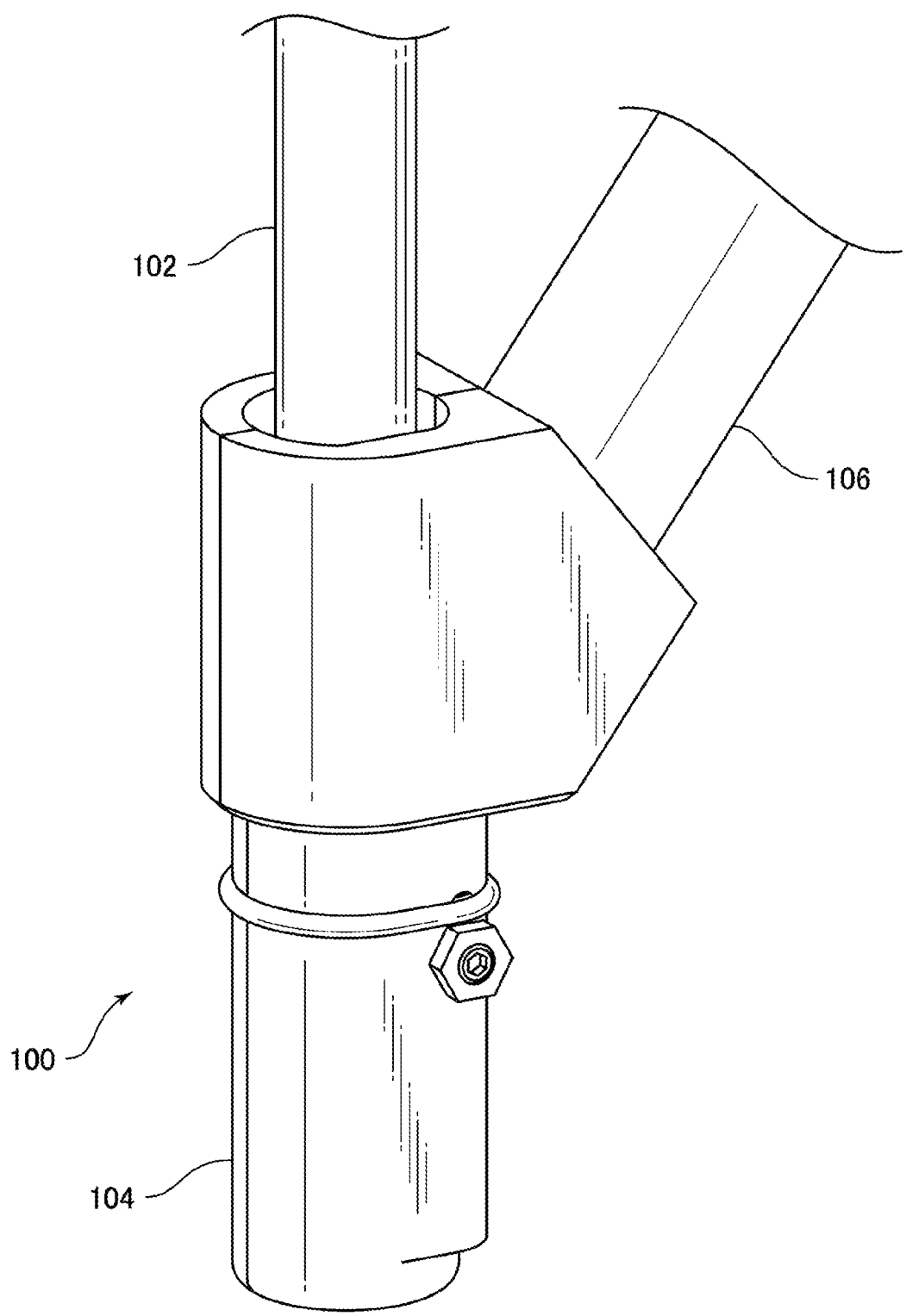
FIG. 1 is a perspective view of the feeding and fastening device according to one embodiment of the present invention.
Figure 2:
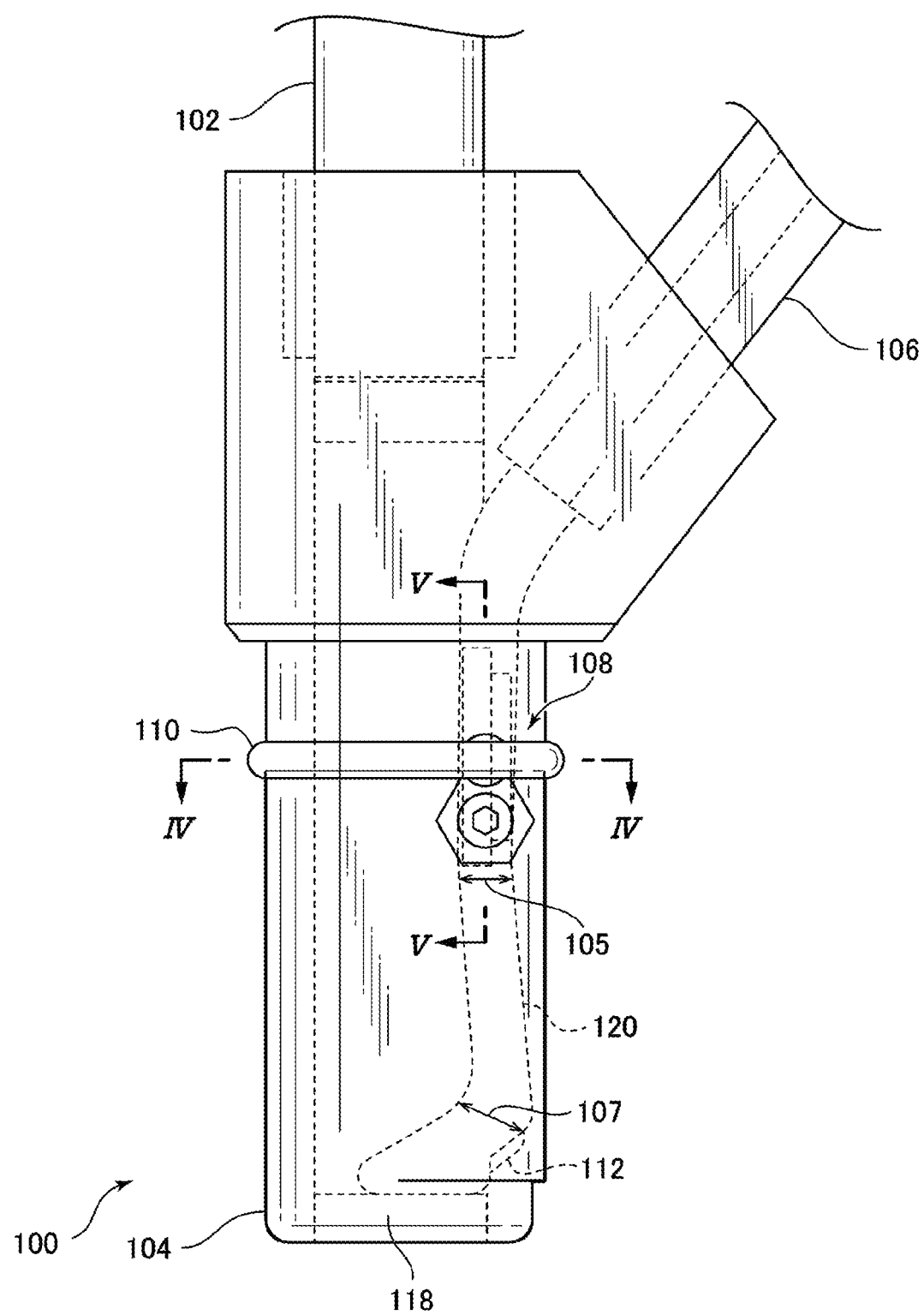
FIG. 2 is a front view of the feeding and fastening device according to one embodiment of the present invention.
Figure 3:
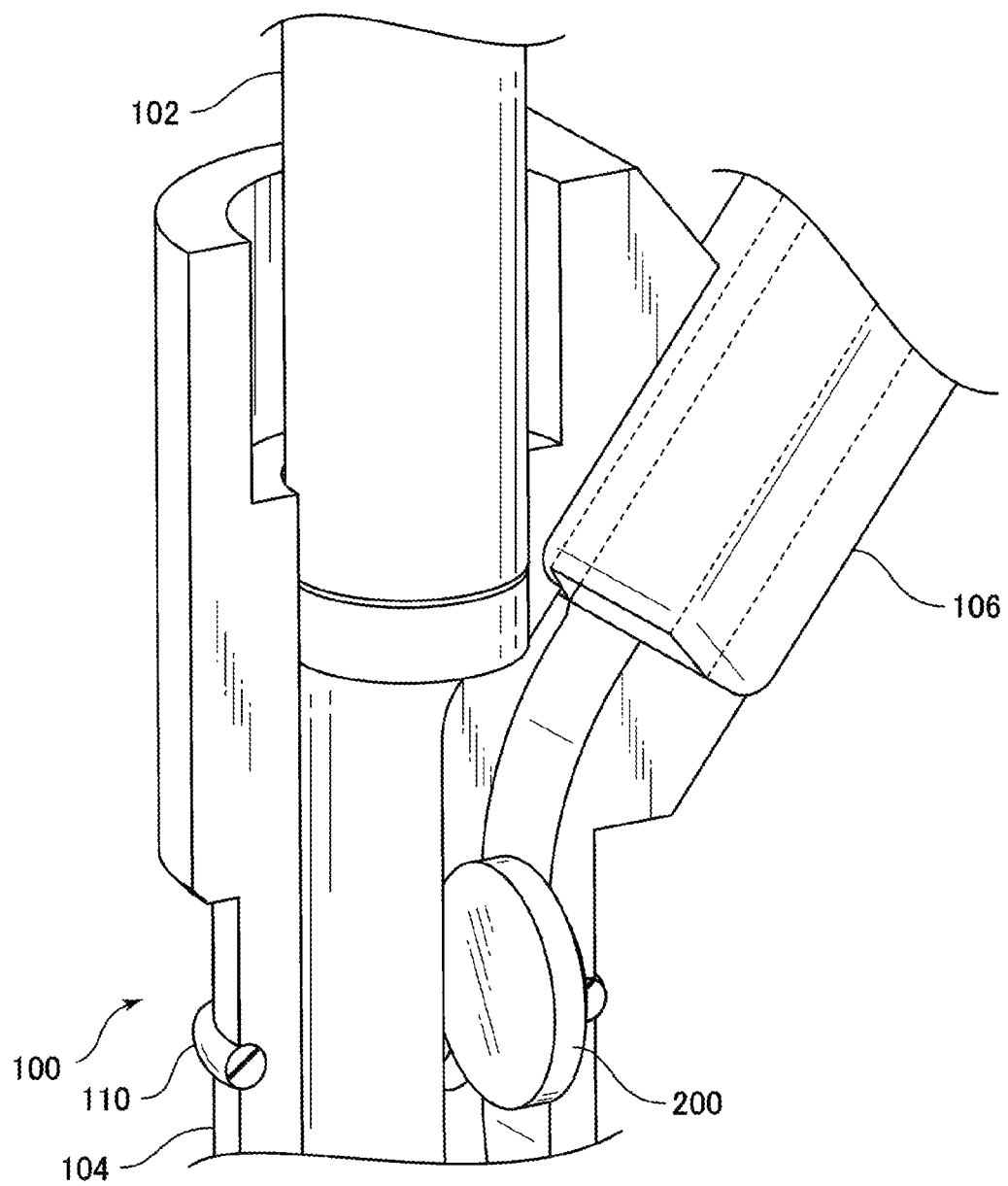
FIG. 3 is a figure showing the state of the internal structure of the feeding and fastening device according to one embodiment of the present invention.

FIG. 1 is a perspective view of a feeding and fastening device according to an embodiment of the present invention. FIG. 2 is a front view of a feeding and fastening device according to an embodiment of the present invention. FIG. 3 is a diagram showing an internal structure of a feeding and fastening device according to an embodiment of the present invention.

The feeding and fastening device 100 according to the present invention is configured so that after the parts input from the feeder device 106 are temporarily held in the pillar-shaped portion 104, by releasing the temporary holding of the part by the punch tool 102 inserted from above, the part is fed to the lower fastening position, and the part is fastened to the member to be attached.

In this embodiment, as an example of the part, a device for feeding and fastening the metal for piercing 200 of a commonly known fastener type to the member to be attached 300 will be described. As shown in FIG. 2, the feeding and fastening device 100 is provided with a pillar-shaped portion 104, a holding portion 108, a part passage route part 120 located below the holding portion 108, a guide portion 112 located between the part passage route portion 120 and the bottom surface, and a fastening portion 118 located on the bottom The side surface of the pillar-shaped portion 104 is connected to the feeder device 106 and is configured to receive a metal for piercing 200 input from the feeder device 106. Further, the pillar-shaped portion 104 is hollow so that a punch tool 102 for fastening the metal for piercing 200 to the member to be attached 300 can be inserted from above.

Figure 4:
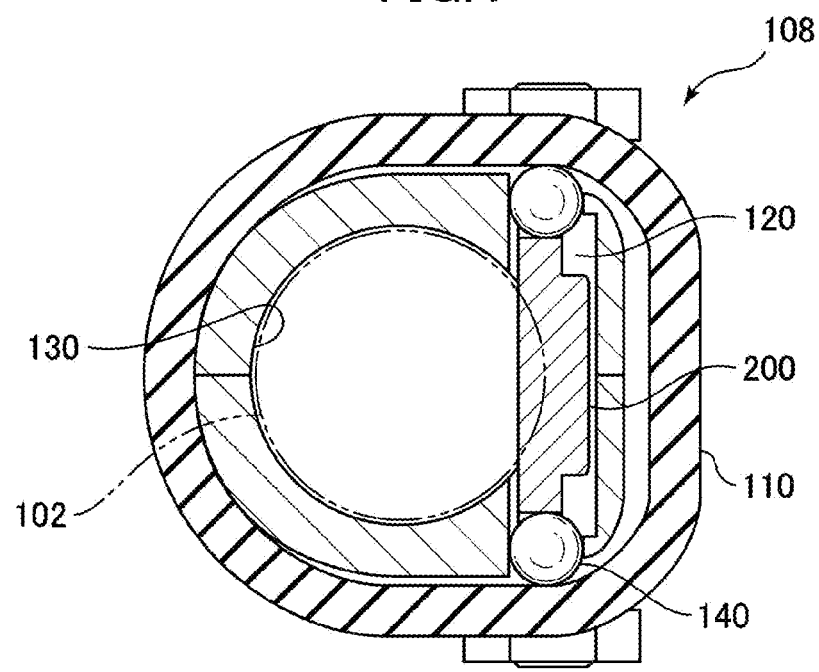
FIG. 4 is a diagram showing a cross section of a holding portion of a feeding and fastening device according to an embodiment of the present invention.
Figure 5:
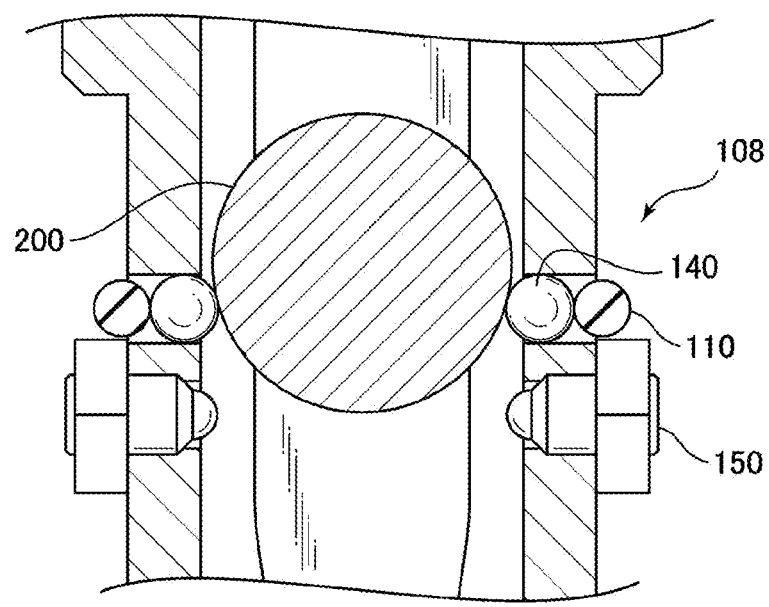
FIG. 5 is a diagram showing a cross section of a holding portion of a feeding and fastening device according to an embodiment of the present invention.

FIG. 4 is a diagram showing a cross section IV-IV of the holding portion 108 of FIG. 2. FIG. 5 is a diagram showing a cross section V-V of the holding portion 108 of FIG. 2.

As shown in FIGS. 2 and 3, the feeder device 106 is arranged adjacent to the lower side of the arranged position so that the holding portion 108 can receive and temporarily hold the metal for piercing 200 input from the feeder device 106 arranged on the side surface of the pillar-shaped portion 104. As shown in FIG. 2, the holding portion 108 is arranged so as to partially overlap the hollow portion of the pillar-shaped portion 104, and is configured to temporarily hold the metal for piercing 200 at a position partially overlapped with the hollow portion of the pillar-shaped portion 104.

With this configuration, as shown in FIG. 4, the metal for piercing 200 partially overlaps with the punch tool 102 in a plan view, and by pushing down the punch tool 102 from above, the upper end portion (flange) 220 of the metal for piercing 200 held by the holding portion 108 is pushed and released from the holding portion 108, making it possible to guide to the part passage route portion 120 on the lower side of the pillar shape portion 104.

The feeding and fastening device 100 is provided with a holding portion 108 as a mechanism that enables temporary holding in the path through which the metal for piercing 200 passes, so that units of the metal for piercing 200 can be loaded one by one into the fastening portion 118 of the feeding and fastening device 100.

When possibly using in an automatic fastening system, after the metal for piercing 200 is fastened to the member to be attached, the next unit of metal for piercing 200 for fastening is automatically sent into the feeding and fastening device 100.

Lacking the temporary holding mechanism of the holding portion 108, the sent metal for piercing 200 is discharged as is to the outside of the feeding and fastening device 100. By mounting a temporary holding mechanism by the holding portion 108 and holding units of the metal for piercing 200 one by one in the feeding and fastening device 100, units of the metal for piercing 200 can be sent out to the fastening portion 118 one by one.

As shown in FIG. 4, in this embodiment, the holding portion 108 is provided with two mechanisms: a first mechanism for holding steel balls 140 provided at two radial locations by applying pressure with an O-ring 110, and a second or alternative mechanism for holding the metal for piercing 200 with a ball plunger 150 (detent device). Alternatively, the holding portion 108 may be designed by attaching a mechanism having a stopper function such as a spring or a locking cam as a temporary holding mechanism. Also, the mounting position and height can be appropriately determined by setting the mounting position of the holding portion 108 to a position that does not interfere with the operation.

The part passage route portion 120 extends downward from the holding portion 108; to allow the metal for piercing 200 to pass while maintaining a state in which the front surface and the back surface of the metal for piercing 200 are substantially parallel to each other in the vertical direction; the metal for piercing 200 has a cross section with a width in which the front and back sides are not inverted. For example, in order to maintain the determined posture directions of the front surface and the back surface of the metal for piercing 200, the cross-sectional shape of the part passage route portion 120 together with the part insertion port is rectangular. The part passage route portion 120 has a structure wherein when the metal for piercing 200 temporarily held by the ball plunger 150 is released, it naturally falls vertically in a thin, rectangular parallelepiped passage route. The part passage route portion 120 keeps the directions of the front surface and the back surface of the metal for piercing 200 constant by forming it into a rectangular parallelepiped shape; by designing so as not to create a space for inversion, the structure is such that the metal for piercing 200 introduced from the feeder device 106 through the feed tube can be fed to the guide portion 112 of the feeding and fastening device 100.

The guide portion 112 is connected to the lower side of the part passage route portion 120 and is configured such that the metal for piercing 200 that has passed through the part passage route portion 120 is guided from a state in which the front surface and the back surface of the metal for piercing 200 are vertically parallel to a state in which the front surface and the back surface of the metal for piercing 200 are oriented in the horizontal direction. As a specific structure, the guide portion 112 is provided with an inclination angle between the part passage route portion 120 and the fastening portion 118, and a guide groove (reference numeral 122 in FIGS. 7A, B and C) is machined to guide the surface of the metal for piercing 200 to gradually face upward on the inclined surface.

Further, the guide portion 112 is configured so that, by having a width 107 wider than the width 105 of the part passage route portion 120, the metal for piercing 200 can be smoothly guided from the vertical state where the front and back surfaces of the metal for piercing 200 are vertically parallel to the horizontal state where the front surface and the back surface of the metal for piercing 200 are oriented horizontally, through the intermediate state where the front surface and the back surface of the metal for piercing 200 are oriented diagonally. If the width 107 of the guide portion 112 is too narrow, the metal for piercing that has naturally fallen cannot be converted in the horizontal direction and is caught, so the width 107 is wider than the width 105; on the other hand, the width 107 is set to a width smaller than the diameter of the metal for piercing 200 inasmuch as if it is too wide, a space for inversion is created.

Moreover, the portion where the inclination angle is provided is largely R-processed (smoothly radially curved) so that the front surface and the back surface of the metal for piercing 200 are reoriented in the horizontal direction from the vertical state where the front surface and the back surface of the metal for piercing 200 are parallel to the vertical direction. As a result, the structural design is such that the flange 220 of the metal for piercing 200 can pass through without being caught.

In addition, at the time of entry of the tip of the metal for piercing 200 that has fallen in the vertical direction, by inserting the back surface portion 230 of the metal for piercing 200, the guide groove (reference numeral 122 in FIG. 7) plays a role as a guide rail for smoothly loading the back surface portion 230 of the metal for piercing 200 into the fastening portion 118 while smoothly changing the orientation of the metal for piercing 200 from the vertical direction to the horizontal direction.

By the above radius of curvature and guide groove, the metal for piercing 200 that has naturally fallen in the feeding and fastening device 100 in the vertical direction smoothly changes to the horizontal direction and can be loaded into the fastening portion 118 of the feeding and fastening device 100 without clogging.

As shown in FIG. 2, the fastening portion 118 is located at the bottom of the pillar-shaped portion 104; the back surface portion 230 of the metal for piercing 200 does not have a bottom surface so as to come into contact with the member to be attached 300 in a horizontal state where the front surface and the back surface of the metal for piercing 200 are oriented horizontally by the guiding portion 112. In addition, the fastening portion 118 is configured of a diameter substantially the same as the diameter of the metal for piercing 200 so that the position of the metal for piercing 200 does not vary. The fastening portion 118 is configured to fasten the metal for piercing 200 to the member to be attached 300 by pressing from above with a punch tool 102 in a horizontal state where the front surface and the back surface of the metal for piercing 200 face in the horizontal direction.

As a first embodiment of the metal for piercing loading method using the feeding and fastening device 100 according to the present invention, an explanation is hereinbelow provided of the flow of the process for receiving the metal for piercing 200, feeding the metal for piercing 200 to the fastening position, and fastening the metal for piercing 200 to the member to be attached.

Figure 6:
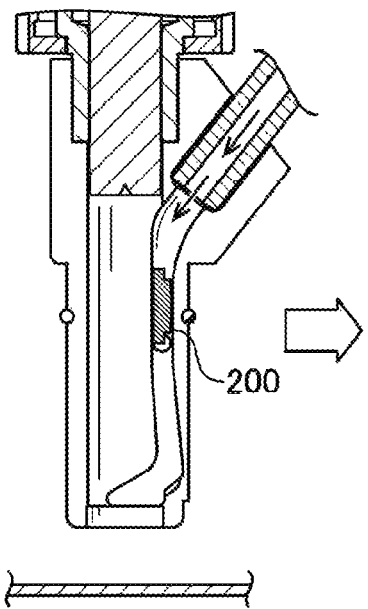
FIG. 6A though F are a sequence of diagrams showing a first embodiment of the method steps for loading a metal for piercing.
Figure 6:
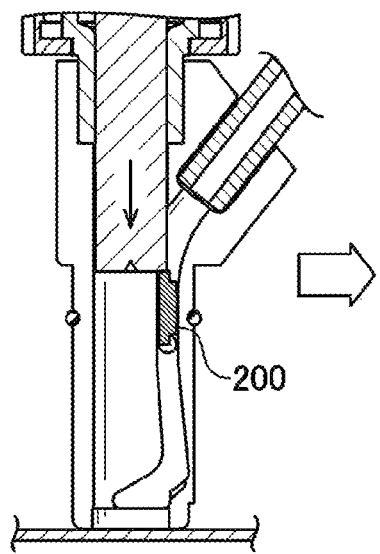
Figure 6:
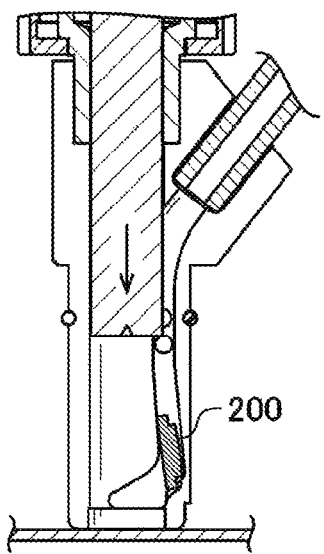
Figure 6:
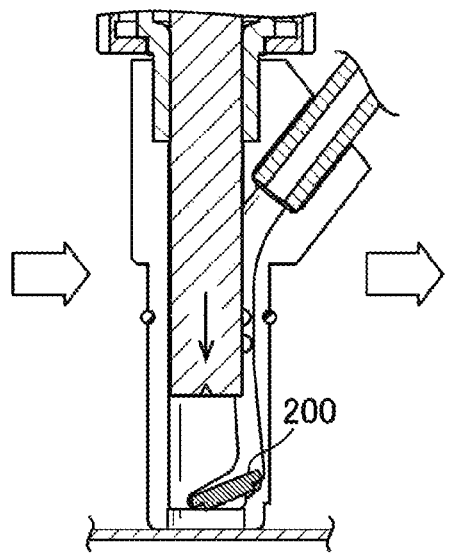
Figure 6:
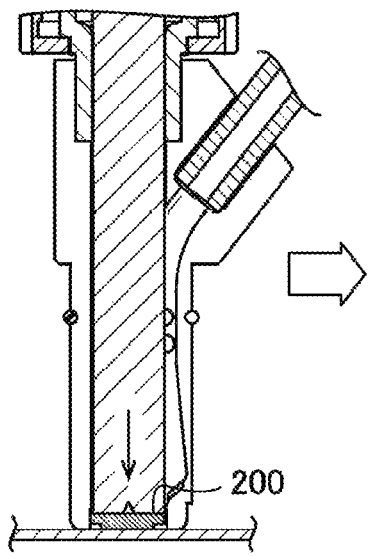
Figure 6:
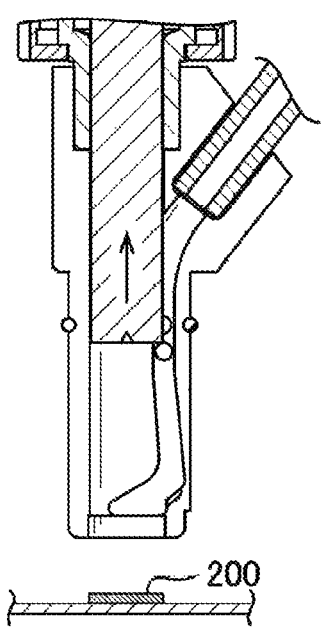
Figure 7:
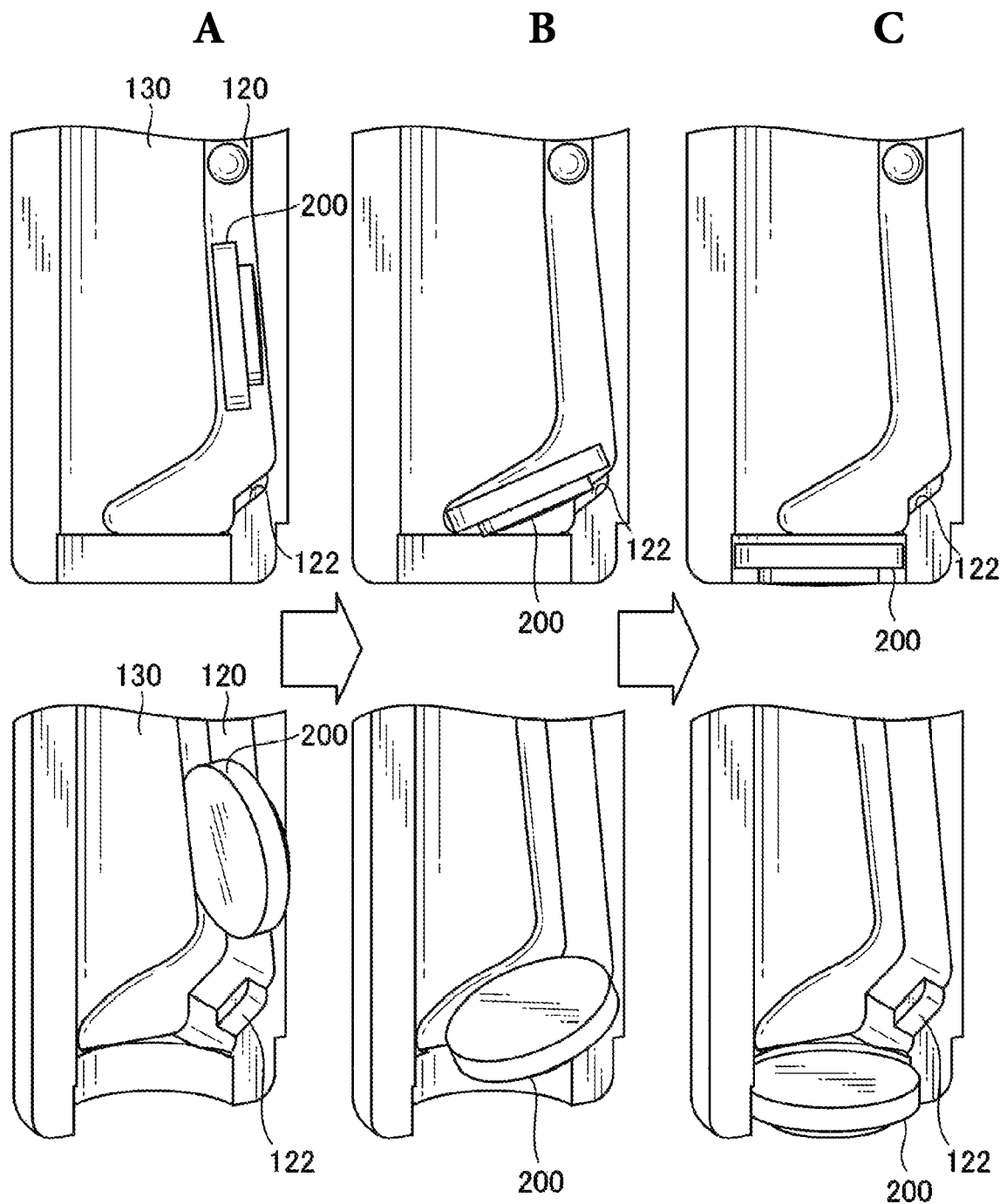
FIG. 7A though C are enlarged views showing the internal structure around the guide portion for the FIG. 6 first embodiment of the method steps for loading a metal for piercing.

FIG. 6 shows a first embodiment of metal for piercing loading. FIG. 7 is an enlarged view showing the internal structure around the guide portion 112 for the first embodiment of metal for piercing loading.

In this first method embodiment, first, as shown in FIG. 6A, the metal for piercing 200 is temporarily held by the holding portion 108 when it is introduced by air pressure feeding from the square tube of the feeder device 106.

Next, as shown in FIG. 6B, with the metal for piercing 200 held by the holding portion 108, when the punch tool 102 is lowered to push down the side surface of the metal for piercing 200, the metal for piercing 200 is released from the holding portion 108 and naturally falls in the part passage route portion 120. In this case, the width of the part passage route portion 120 is designed to be about the same as the thickness of the metal for piercing 200, and the metal for piercing 200 is not inverted.

Figure 9:
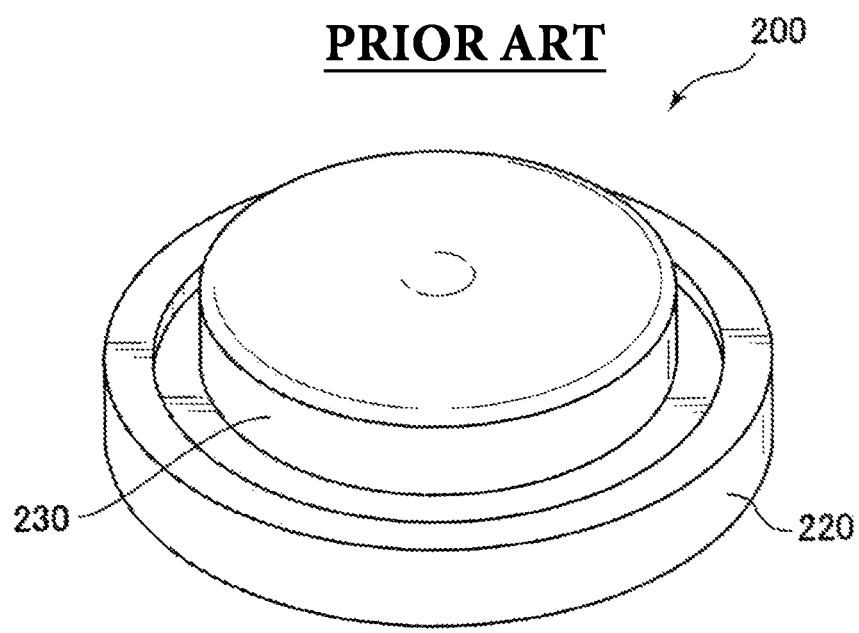
FIG. 9 is a perspective view of the known metal for piercing which is acted upon by the feeding and fastening device of the invention.

As shown in FIG. 6C, when the metal for piercing 200 naturally falls in the part passage route portion 120, it reaches the guide portion 112. At this time, as shown in FIGS. 7A and 7B, the guide portion 112 has an inclined surface, and the inclined surface has a guide groove 122 that is one step lower. By inserting the back surface portion 230 (see FIG. 9) of the pierce metal 200 that has fallen in the vertical direction into the guide groove 122, the direction of the pierce metal 200 can be smoothly changed from the vertical direction to the horizontal direction. As a result, as shown in FIG. 6D, in the guide portion 112, the metal for piercing 200 is guided from a vertical state in which the front surface and the back surface of the metal for piercing 200 are oriented in the vertical direction to a horizontal state in which the front surface and the back surface are oriented in the horizontal direction without inverting the front and back surfaces.

When the metal for piercing 200 smoothly moves through the guide portion 112, as shown in FIGS. 6E and 7C, the front surface and the back surface of the metal for piercing 200 are completely horizontally oriented at the fastening portion 118.

Further, the metal for piercing 200 can be arranged in the fastening portion 118 without variation in position.

Next, the metal for piercing 200 is fastened to the attached member as shown in FIG. 6F by the downward pressing force of the punch tool 102 against the metal for piercing 200. At this time, the punched waste material of the attached member passes through the die and is discharged to complete the fastening.

After that, when the punch tool 102 rises to the position shown in FIG. 6A and returns, the next unit of metal for piercing 200 is charged by air pressure feeding from the square tube of the feeder device 106, and the next metal for piercing 200 can be fastened. In this case, the timing at which the next metal for piercing 200 is inserted may be, for example, the timing at which the punch tool 102 detects that it has passed the holding portion 108 in the upward direction. Further, a predetermined interval may be set so that the feeder device automatically sends the feed.

According to the metal for piercing loading method of the present embodiment, coin-shaped parts such as metal for piercing 200 can be guided one by one in order without variation into the fastening portion 118 and fastened to the member to be attached 300.

Figure 8:
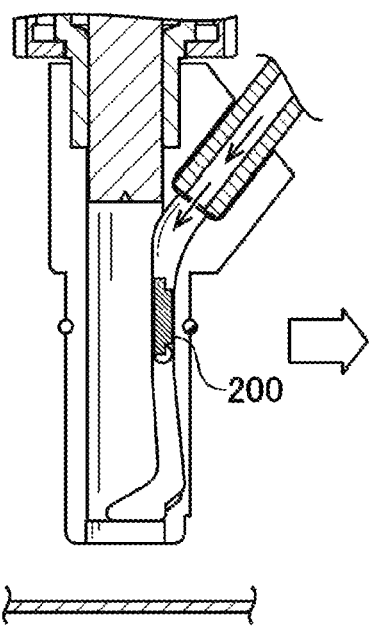
FIG. 8A though E are a sequence of diagrams showing a second embodiment of the method steps for loading of a metal for piercing.
Figure 8:
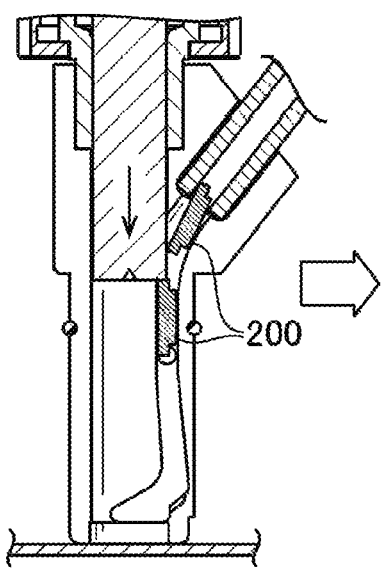
Figure 8:
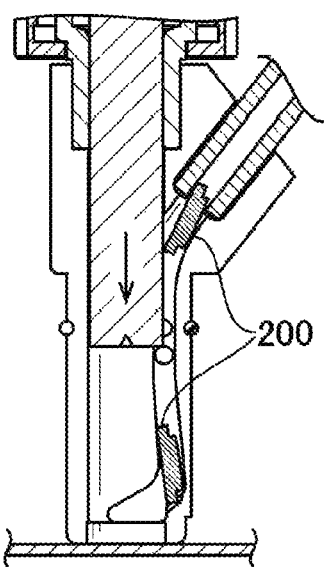
Figure 8:
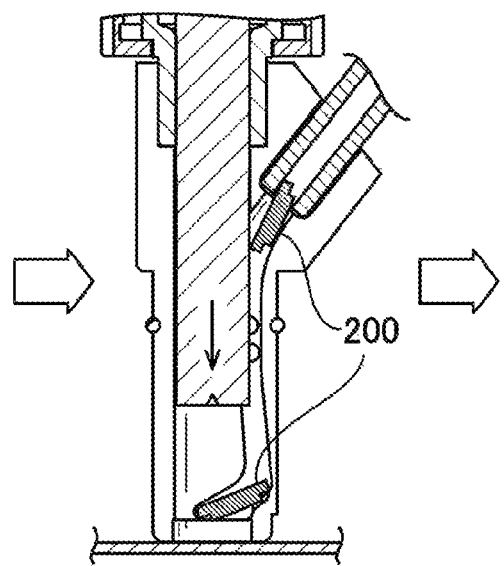
Figure 8:
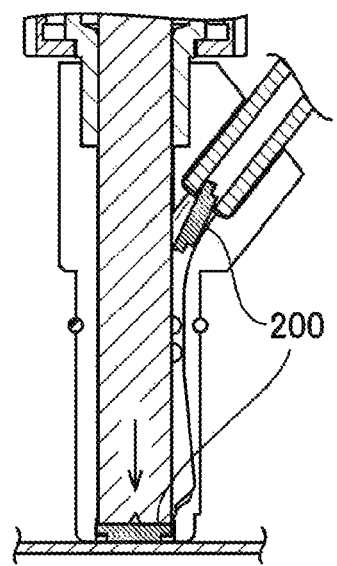

FIG. 8 illustrates a second embodiment of the method for loading the metal for piercing.

In this embodiment, as in the first embodiment, as shown in FIG. 8A, the metal for piercing 200 is first temporarily held by the holding portion 108 when it is charged by air pressure feeding from the square tube of the feeder device 106.

Next, as shown in FIG. 8B, with the metal for piercing 200 held by the holding portion 108, when the punch tool 102 is lowered to push down the side surface of the metal for piercing 200, the metal for piercing 200 is released from the holding portion 108 and naturally falls in the part passage route portion 120. Further, this embodiment is configured so that when the punch tool 102 descends to a position where it abuts on the side surface of the metal for piercing 200, the next unit of metal for piercing 200 is inserted from the feed device 106. In this case, the next unit of metal for piercing 200 is in contact with the side surface of the punch tool 102, is prevented from being fed from the side surface of the pillar-shaped portion 104, and does not reach the holding portion 108. The next unit of metal for piercing 200 remains in the square tube of the feeder device 106.

Next, as shown in FIGS. 8C, D and E, similar to the first embodiment, the metal for piercing 200 is guided to the fastening portion 118 so that the front surface and the back surface are completely oriented in the horizontal direction, and the metal for piercing 200 is fastened to the member to be attached 300.

In this embodiment, after fastening the first metal for piercing 200, by raising the punch tool 102 to fasten the second metal for piercing 200 and returning it to the position shown in FIG. 8A, the second metal for piercing 200 can naturally fall and be held by the holding portion 108. With such a configuration, it is possible to supply only one metal for piercing 200 to the holding portion 108 at any time, and it is possible to realize a mechanism for feeding the metal for piercing 200 units one by one.

According to this embodiment, at the timing when the fastening of one unit of metal for piercing 200 to the member to be attached is completed and the punch tool is returned to the original raised position (timing of returning from the stage of FIG. 8E to the stage of FIG. 8A), since the next unit of metal for piercing 200 is already held by the holding portion 108 and since it is possible to immediately move to the next fastening operation of the metal for piercing 200, it is possible to proceed with fastening more efficiently.

In the present invention, this mechanism can be applied to parts such as metal for piercing to be fed as long as the parts have a shape that allows the passage route (rectangular shape) in the receiver to be loaded vertically.

As described above, an embodiment and an embodiment of the feeding and fastening device according to the present invention have been described. It is easily understood that the present invention is not limited to the above examples, and various modifications can be made thereto; also, as long as they are within the scope of descriptions in each claim and matters equivalent thereto, they are naturally included in the technical scope of the present invention. Although the above embodiment targets metal for piercing as parts, this is used merely an example, and the present invention is not limited to this specific embodiment.

DESCRIPTION OF REFERENCE NUMERALS

100 Feeding and fastening device
102 Punch tool
  103 die
104 Pillar-shaped portion
106 Feeder device
108 Holding portion
110 O-ring
112 Guide portion
  107 width of guide portion
118 Fastening portion
120 Parts passage route part/portion
  105 width of PPRP
122 Guide groove
130 Punch tool passage route
140 Steel balls
150 Ball plunger/detent
200 Metal for piercing
  220 Flange (upper end portion)
  230 Back surface portion
300 member to be attached/workpiece

What is claimed is:

1. A feeding and fastening device operable to receive and feed a coin-shaped part having a front surface and a back surface and to fasten the coin shaped part to a workpiece; the feeding and fastening device comprising: a punch tool operable for fastening the coin shaped part to the workpiece; a feeding device operable to feed the coin shaped part one at a time toward the punch tool; a hollow pillar-shaped portion below the punch tool and through which the punch tool can be inserted from above; a holding portion configured to temporarily hold the coin shaped part fed from the feeding device though a side surface of the hollow pillar-shaped portion and to release the coin shaped part from the temporary holding when the punch tool pushes down on that coin shaped part; a part passage route portion, extending downward from the holding portion so that the coin shaped part can pass through while maintaining a first state in which the front surface and the back surface are parallel to each other in a vertical direction, and wherein the part passage route portion has a cross section of a width that prevents inversion of the front surface and the back surface; a guide portion below the passage route portion that guides the coin shaped part received from the part passage route portion from the first state to a second state in which the front surface and the back surface of the coin shaped part are oriented in a horizontal direction; and a fastening portion below the guide portion that receives the coin shaped part in the second state and locates the coin shaped part above the workpiece until struck by the punch tool.

2. A feeding and fastening device according to claim 1, wherein the holding portion includes two steel balls biased to hold the coin shaped part.

3. A feeding and fastening device according to claim 1, wherein the guide portion has an inclined surface inclined below the part passage route portion to guide the coin shaped part from the first state to the second state, and the inclined surface has a guide groove that guides the front surface of the coin shaped part to gradually face upward.

4. A feeding and fastening device according to claim 1, wherein the hollow pillar-shaped portion and the part passage route portion are configured so as to overlap at least partially as viewed in a plan view.

5. A feeding and fastening device according to claim 1, wherein when the punch tool pushes the coin shaped part past the holding portion, a next coin shaped part which the punch tool is to be fed next is blocked from being fed through the side surface of the hollow pillar-shaped portion by a shaft of the punch tool.

6. A feeding and fastening device according to claim 1, wherein the coin shaped part is for piercing the workpiece and made of metal.

7. A method of feeding a coin-shaped part having a front surface and a back surface and fastening the coin-shaped part to a workpiece, the method comprising the following steps: providing a feeding and joining device comprising: a punch tool for fastening the coin shaped part to the workpiece; a feeding device configured to feed the coin shaped part one at a time toward the punch tool; a hollow pillar-shaped portion below the punch tool and configured so that the punch tool can be inserted from above; a holding portion configured to temporarily hold the coin shaped part fed from the feeding device through a side surface of the hollow pillar-shaped portion and to release the coin shaped part from the temporary holding when the punch tool pushes down on that coin-shaped part; a part passage route portion, extending downward from the holding portion so that the coin shaped part can pass through while maintaining a first state in which the front surface and the back surface are parallel to each other in a vertical direction, and wherein the part passage route portion has a cross section of a width that prevents inversion of the front surface and the back surface; a guide portion below the passage route portion that guides the coin shaped part received from the part passage route portion from the first state to a second state in which the front surface and the back surface of the coin shaped part are oriented in a horizontal direction; and a fastening portion below the guide portion that receives the coin shaped part in the second state and locates the coin shaped part above the workpiece until struck by the punch tool feeding the coin-shaped part from the side surface of the hollow pillar-shaped portion of the device to the holding portion holding the coin-shaped part temporarily in the holding portion; releasing the coin-shaped part from the temporary hold by the holding portion by pushing the coin-shaped part downward by the punch tool inserted from above the hollow pillar-shaped portion; dropping the coin-shaped part to fall naturally in the part passage route that extends downward from the holding portion while maintaining the front and back surfaces of the coin-shaped part in the first state; guiding the coin-shaped part that has fallen through the part passage route from the first state to the second state; and fastening the coin-shaped part to the workpiece with the front surface and back surface of the coin-shaped part horizontally parallel.

8. The method according to claim 7, wherein the guiding step further comprises guiding the front surface of the coin-shaped part to gradually face upward by a guide groove formed on an inclined surface below the part passage route.

9. The method according to claim 7, wherein when the punch tool pushes the coin shaped part past the holding portion, then further including the step of blocking the descent of a next coin shaped part to be fed to the punch tool from being fed through the side surface of the hollow pillar-shaped portion by a shaft of the punch tool.

10. A feeding and fastening device that receives, feeds, and fastens to a workpiece a fastener having a coin-shape and including a first axial portion with a first diameter and a second axial portion with a second diameter less than the first diameter, and defining an axial thickness of the fastener; the feeding and fastening device comprising: a punch tool for fastening the fastener to the workpiece; a feeding device configured to feed the fastener one at a time toward the punch tool; a cylindrical portion open at a top and a bottom and located below the punch tool so that the punch tool can be inserted from above; a holding portion including a detent to temporarily hold the fastener fed from the feeding device through a side opening into the cylindrical portion and to release the fastener from the temporary hold when the punch tool pushes down on that fastener; a part passage route portion, extending downward from the holding portion so that the fastener can pass through while maintaining a vertical state in which the first axial portion and the second axial portion are planar parallel in a vertical direction, and wherein the part passage route portion has a cross section sized to prevent inversion of the first axial portion and the second axial portion; a guide portion below the passage route portion that guides the fastener received from the part passage route portion from the vertical state to a horizontal state in which the first axial portion and the second axial portion are planar parallel in a horizontal direction; and a fastening portion below the guide portion that receive s the fastener in the horizontal state and locates the fastener above the workpiece until struck by the punch tool.

11. A feeding and fastening device according to claim 10 where in the detent includes at least one of a ball biased radially inward by a spring and a ball biased radially inward by an encircling O ring to releasably hold the fastener.

12. A feeding and fastening device according to claim 10, wherein the guide portion has an inclined surface to guide the fastener from the first state to the second state, and the inclined surface includes a guide groove that that engages the second axial portion to turn the faster from the vertical state to the horizontal state.

13. A feeding and fastening device according to claim 10, wherein the hollow pillar-shaped portion and the part passage route portion are vertically overlap as viewed in a plan view.

14. A feeding and fastening device according to claim 10, wherein, when the punch tool pushes the coin shaped part past the holding portion, a next coin shaped part which the punch tool is to be fed next is blocked from being fed through the side surface of the hollow pillar-shaped portion by a shaft of the punch tool.

15. A feeding and fastening device according to claim 10, wherein the punch tool includes a die locatable below the workpiece.

16. A feeding and fastening device according to claim 10, wherein the part passage route portion defines a first width and the guide portion defines a second width wider than the first width.

17. A feeding and fastening device according to claim 16, wherein the second width is smaller than the first diameter of the first axial portion of the fastener.

18. A feeding and fastening device according to claim 16, wherein the first width is only slightly greater than the thickness of the fastener.

* * * * *